US011806908B2

United States Patent
Chen et al.

(10) Patent No.: US 11,806,908 B2
(45) Date of Patent: Nov. 7, 2023

(54) EXTRUDING SYSTEM AND METHOD OF EXTRUDING

(71) Applicant: OTRAJET INC., Taichung (TW)

(72) Inventors: Fa-Shen Chen, Taichung (TW); Liang-Hui Yeh, Taichung (TW)

(73) Assignee: OTRAJET INC., Taichung (TW)

( * ) Notice: Subject to any disclaimer, the term of this patent is extended or adjusted under 35 U.S.C. 154(b) by 132 days.

(21) Appl. No.: 16/831,386

(22) Filed: Mar. 26, 2020

(65) Prior Publication Data

US 2020/0223118 A1 Jul. 16, 2020

Related U.S. Application Data

(63) Continuation-in-part of application No. 15/647,087, filed on Jul. 11, 2017, now Pat. No. 10,913,189.
(Continued)

(30) Foreign Application Priority Data

Jun. 5, 2017 (TW) .................................. 106118578

(51) Int. Cl.
*B29C 48/00* (2019.01)
*B29C 48/255* (2019.01)
(Continued)

(52) U.S. Cl.
CPC ...... *B29C 48/0012* (2019.02); *B29C 44/3446* (2013.01); *B29C 48/2552* (2019.02);
(Continued)

(58) Field of Classification Search
CPC . B29C 48/0012; B29C 48/2552; B29C 48/92; B29C 48/285; B29C 48/3446;
(Continued)

(56) References Cited

U.S. PATENT DOCUMENTS 4,779,989 A 10/1988 Barr
6,884,823 B1 * 4/2005 Pierick .................... B29C 44/00
521/79
(Continued)

FOREIGN PATENT DOCUMENTS

CN 103057061 B 4/2013
CN 103057061 B * 10/2015
(Continued)

OTHER PUBLICATIONS

Chen et al., CN103057061B, Publ. Oct. 28, 2015, machine translation Chinese to English (Year: 2015).*
(Continued)

*Primary Examiner* — Joseph S Del Sole
*Assistant Examiner* — Lawrence D. Hohenbrink, Jr.
(74) *Attorney, Agent, or Firm* — WPAT LAW; Anthony King

(57) ABSTRACT

An extruding system includes a melting unit configured to convey a polymeric material, a mixing unit configured to mix the polymeric material with a blowing agent to form a mixture, an injection unit configured to inject the mixture, a first flow control element disposed between the melting unit and the mixing unit, and a second flow control element disposed between the mixing unit and the injection unit. A method of extruding includes conveying a polymeric material from a melting unit to a mixing unit, conveying a blowing agent into the mixing unit, mixing the polymeric material with the blowing agent to form a mixture, conveying the mixture from the mixing unit to an injection unit, and discharging the mixture from the injection unit, wherein flow of the polymeric material is controlled by a first flow control element, and flow of the mixture is controlled by a second flow control element.

20 Claims, 12 Drawing Sheets

Related U.S. Application Data

(60) Provisional application No. 62/915,287, filed on Oct. 15, 2019.

(51) Int. Cl.
   *B29C 48/92* (2019.01)
   *B29C 44/34* (2006.01)
   *B29C 48/285* (2019.01)
   *B29C 44/42* (2006.01)
   *B29C 45/18* (2006.01)

(52) U.S. Cl.
   CPC .......... *B29C 48/285* (2019.02); *B29C 48/92* (2019.02); *B29C 44/348* (2013.01); *B29C 44/3423* (2013.01); *B29C 44/42* (2013.01); *B29C 45/1808* (2013.01)

(58) Field of Classification Search
   CPC ... B29C 44/3446; B29C 44/348; B29C 44/42; B29C 44/3423; B29C 45/1808
   USPC .......................................................... 425/149
   See application file for complete search history.

(56) References Cited

U.S. PATENT DOCUMENTS

| | | | |
|---|---|---|---|
| 2002/0024165 A1 | | 2/2002 | Xu |
| 2003/0168766 A1* | | 9/2003 | Teraoka .................. B29C 48/29 264/50 |
| 2004/0009250 A1* | | 1/2004 | Schuermann ....... B29C 44/0492 425/200 |
| 2007/0183254 A1 | | 8/2007 | Schobert-Csongor et al. |
| 2014/0091489 A1 | | 4/2014 | Kim et al. |
| 2018/0304530 A1* | | 10/2018 | Nadvornik ............ B29C 64/209 |
| 2019/0118432 A1* | | 4/2019 | Burnham ................ B29C 44/60 |

FOREIGN PATENT DOCUMENTS

| | | | |
|---|---|---|---|
| CN | 103057061 B | | 10/2015 |
| CN | 106110934 A | | 11/2016 |
| CN | 109016315 A | * | 12/2018 |
| CN | 109016315 A | | 12/2018 |
| EP | 0376671 A2 | | 7/1990 |
| EP | 0463759 A2 | | 1/1992 |
| EP | 2033758 A1 | | 3/2009 |
| EP | 2962829 A1 | | 1/2016 |
| JP | 2000084968 A | | 3/2000 |
| JP | 2001096603 A | | 4/2001 |
| JP | 2004322341 A | | 11/2004 |
| JP | 2005329582 A | | 12/2005 |
| JP | 2007230087 A | | 9/2007 |
| JP | 2007276321 A | | 10/2007 |
| JP | 2014162144 A | | 9/2014 |
| JP | 2018202847 A | | 12/2018 |
| KR | 10-2005-0071628 A | | 7/2005 |
| KR | 10-2016-0097274 A | | 8/2016 |
| TW | I637987 A | | 10/2018 |

OTHER PUBLICATIONS

CN 109016315 A, Chen et al., machine translation to English, Publ. Dec. 18, 2018, (Year: 2018).*
Search Report dated Mar. 25, 2021 issued by the European Patent Office for the EP patent application No. 20199818.4-1017.
Office Action and Search Report dated Feb. 26, 2020 issued by China Intellectual Property Office for counterpart application No. 201710436817.7
Office Action from the United States Patent and Trademark Office of U.S. Appl. No. 15/647,087, dated Jun. 13, 2019.
Final Office Action from the United States Patent and Trademark Office of U.S. Appl. No. 15/647,087 dated Nov. 27, 2019.
Search Report from the European Patent Office of EP patent application No. 178181313.2 dated Feb. 19, 2018.
Search Report from the European Patent Office of EP patent application No. 20199818.4-1017 dated Mar. 25, 2021.
Notice of allowance dated Feb. 1, 2022 issued by the Japan Patent Office for the Japanese counterpart patent application No. 2020-159695.
Office Action, Cited References and Search Report dated Apr. 29, 2022 issued by the China National Intellectual Property Administration for the Chinese corresponding patent application No. 202011072511.6.
Office action from the European Patent Office of EP patent application No. 20199818.4-1014 dated Mar. 1, 2023.

* cited by examiner

EXTRUDING SYSTEM AND METHOD OF EXTRUDING

CROSS-REFERENCE TO RELATED APPLICATION

This application is a continuation-in-part application of a U.S. patent application entitled MECHANISM FOR MIXING SUPERCRITICAL FLUID AND POLYMER RAW MATERIAL MELT, Ser. No. 15/647,087, filed Jul. 11, 2017, which claims priority of TW patent application Ser. No. 106118578, and this application claims priority of U.S. provisional application Ser. No. 62/915,287, filed Oct. 15, 2019, both of which are incorporated by reference in their entirety.

TECHNICAL FIELD

The present invention is related to an extruding system and a method of extruding, and, in particular, to an extruding system and a method of extruding a mixture of a polymeric material and a blowing agent.

BACKGROUND

A substance is in a supercritical fluid state when it is in an environment having a temperature and pressure above its critical temperature and pressure. Such supercritical fluid is between a gas phase and a liquid phase in nature, has surface tension, viscosity and diffusivity similar to those of a gas, and has density and solvation ability close to those of a liquid. Therefore, in the prior art, by melting a solid-polymer raw material in a high-temperature and high-pressure environment provided by a pressing cartridge, a supercritical fluid may be mixed into a polymer melt, and by using a pressure drop between the pressing cartridge and the chamber space of a mold, after the supercritical fluid enters the chamber space, a plurality of nucleating points are formed in the polymer melt and grow into air bubbles, such that the polymer melt is molded into a foamed polymer article.

The prior art also discloses that a polymer raw material placed in advance in the inner chamber space of a mold is impregnated with a supercritical fluid that subsequently enters the chamber space, and then, due to changes in pressure and temperature in the chamber space, air bubbles are generated as the phase of the supercritical fluid changes, such that the polymer raw material is molded into a foamed polymer article.

Inert gases such as carbon dioxide or nitrogen gas are supercritical fluids commonly used as foaming agents, where carbon dioxide has a critical pressure of 7.185 MPa and a critical temperature of 304.265 K. In the prior art, to keep carbon dioxide in the supercritical fluid state, the temperature and pressure in the pressing cartridge or chamber space are required to be greater than the critical temperature and critical pressure values to avoid segregation. However, in industrial utilization, for example, in the injection-molding process, normally, the injection pressure of 700 to 1500 kg/cm$^2$ can satisfy the pressure required for the injection-molding process. The critical pressure of carbon dioxide of up to 7 MPa is obviously much higher. Therefore, to maintain the supercritical fluid state of carbon dioxide in the pressing cartridge, the injection pressure in the pressing cartridge needs to be raised further, resulting in increased energy consumption.

Although the operating conditions for polymer processing vary depending on the type of raw materials involved, and although there exists an operating condition in which no additional pressure increase is required, since the supercritical fluid must be mixed with the polymer melt into a single-phase solution, in the technical scope using the pressing cartridge for hot-melting, the supercritical fluid is introduced at a metering section of a screw, wherein the metering section is located at the rear section of the pressing cartridge and the polymer raw material is already molten. In this way, the mixing time of the supercritical fluid and the polymer melt is restricted by the rotation speed of the screw in the pressing cartridge, so that undesired, non-uniform mixing may occur, and, after a pressure drop, the nucleation of the air bubbles in the polymer may not be uniform, thereby affecting the forming quality of a foamed polymer article.

BRIEF SUMMARY OF THE INVENTION

One purpose of the present invention is to provide an extruding system and a method of extruding a mixture.

According to one embodiment of the present disclosure, an extruding system is disclosed. The extruding system includes a melting unit configured to convey a polymeric material; a mixing unit configured to receive the polymeric material from the melting unit, mix the polymeric material with a blowing agent, and form a mixture of the polymeric material and the blowing agent; a blowing agent supply unit connected to the mixing unit and configured to convey the blowing agent into the mixing unit; and an injection unit configured to inject the mixture. The extruding system further includes a first flow control element disposed between the melting unit and the mixing unit and configured to control flow of the polymeric material from the melting unit to the mixing unit; and a second flow control element disposed between the mixing unit and the injection unit and configured to control flow of the mixture from the mixing unit to the injection unit.

According to one embodiment of the present disclosure, an extruding system is disclosed. The extruding system includes a melting unit configured to convey a polymeric material; a mixing unit configured to receive the polymeric material from the melting unit and configured to mix the polymeric material with a blowing agent and to form a mixture of the polymeric material and the blowing agent; a blowing agent supply unit connected to the mixing unit and configured to convey the blowing agent into the mixing unit; and an injection unit configured to inject the mixture. The extruding system further includes a monitoring module configured to monitor the extruding system in real time, wherein the monitoring module includes a sensor disposed in the extruding system.

According to one embodiment of the present disclosure, a method of extruding a mixture of a polymeric material and a blowing agent is disclosed. The method of extruding a mixture includes conveying the polymeric material from a melting unit to a mixing unit; conveying the blowing agent into the mixing unit; and mixing the polymeric material with the blowing agent in the mixing unit to form the mixture. The method further includes conveying the mixture from the mixing unit to an injection unit and discharging a first amount of the mixture from the injection unit. The conveyance of the polymeric material from the melting unit to the mixing unit includes controlling flow of the polymeric material from the melting unit to the mixing unit by a first flow control element disposed between the melting unit and the mixing unit, and the conveyance of the mixture from the mixing unit to the injection unit includes controlling flow of the mixture from the mixing unit to the injection unit by a second flow control element disposed between the mixing unit and the injection unit.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
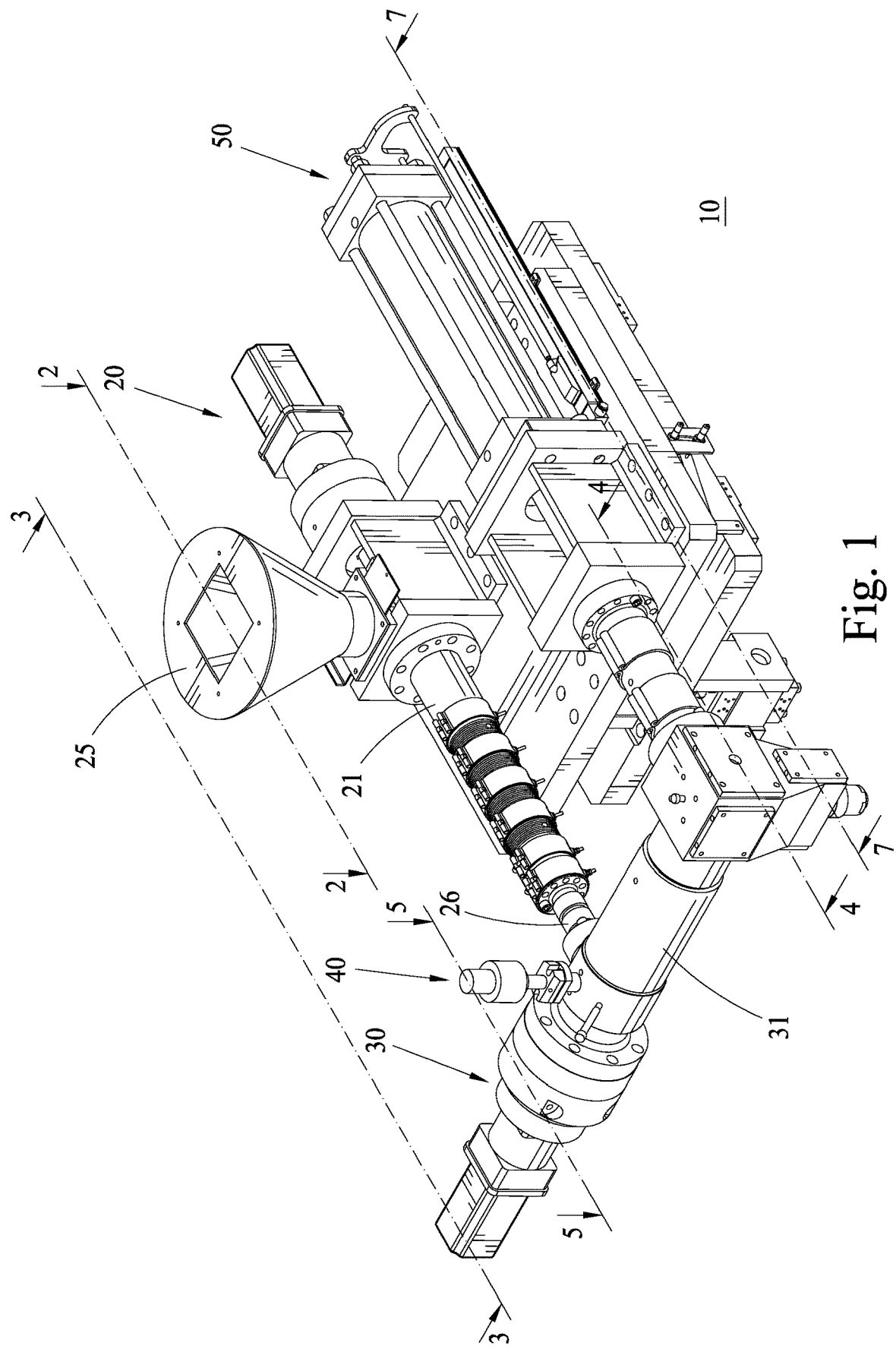
FIG. 1 is a perspective view of an extruding system according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the term "about." Accordingly, unless indicated to the contrary, the numerical parameters set forth in the present disclosure and the attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Referring to FIG. 1, a mechanism 10 for mixing a supercritical fluid and a polymer raw material melt provided in a preferred embodiment of the present invention includes a hot-melting unit 20, a mixing unit 30, a blowing agent supply unit 40, and an injection unit 50.

Figure 2:
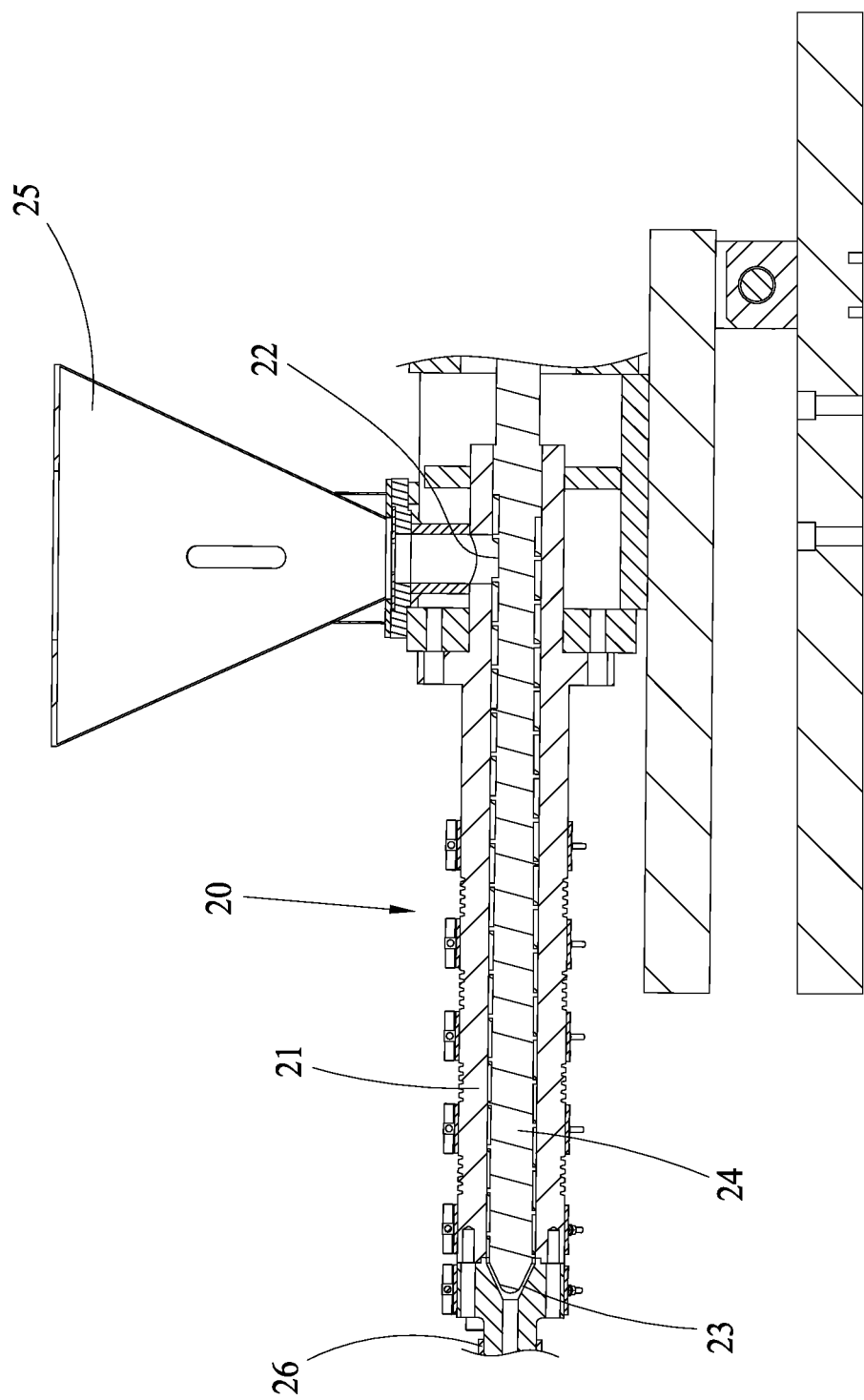
FIG. 2 is a cross-sectional view taken along the section line 2-2 in FIG. 1.
Figure 3:
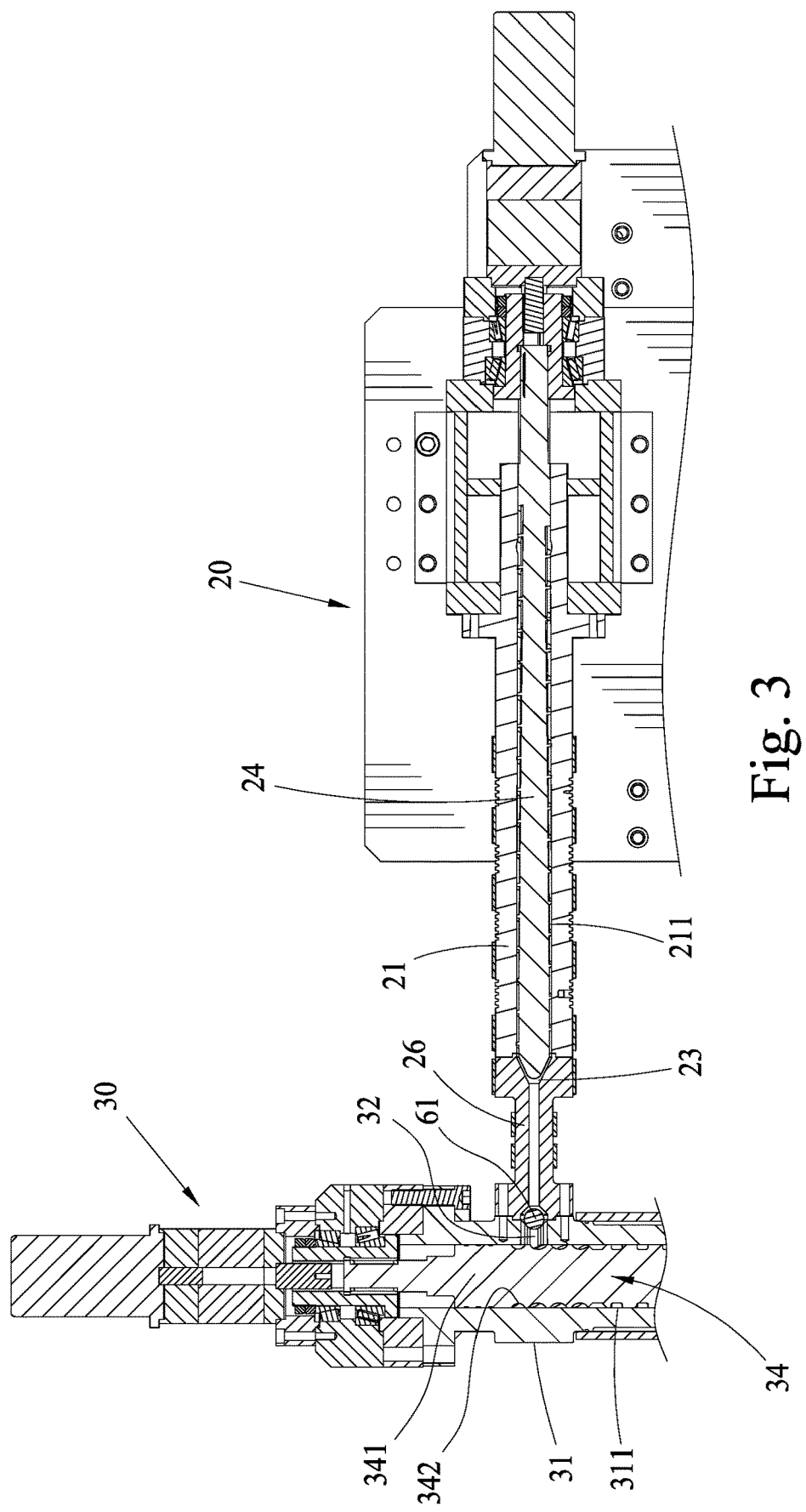
FIG. 3 is a cross-sectional view taken along the section line 3-3 in FIG. 1.

As shown in FIG. 2 and FIG. 3, the hot-melting unit 20 has a hollow pressing cartridge 21 in the shape of a cylinder, in accordance with the conventional injection-molding or extrusion-molding technology. A first feeding passage 22 and a first discharging passage 23 are disposed at two ends of the pressing cartridge 21, respectively, and communicate with a pressing cartridge inner space 211 of the pressing cartridge 21. A screw-shaped pushing member 24 is coaxial with the cylindrical axis of the pressing cartridge 21, and is rotatably disposed in the pressing cartridge inner space 211 of the pressing cartridge 21. A feeding hopper 25 is fixedly disposed on one end of the pressing cartridge 21, and communicates with the pressing cartridge inner space 211 through the first feeding passage 22. A discharging end member 26 is disposed on the other end of the pressing cartridge 21, and communicates with the pressing cartridge inner space 211 through the first discharging passage 23.

According to the above configuration, an external solid-polymer raw material can be conveyed into the pressing cartridge inner space 211 from the feeding hopper 25 through the first feeding passage 22, and the external solid-polymer raw material is forced toward the first discharging passage 23 by rotation of the pushing member 24. The external solid-polymer raw material is heated to a flowable melt by hot-melting as it moves, and flows out from the first discharging passage 23. The technical details of hot-melting are known in the prior art, and description thereof is omitted herein.

Figure 4:
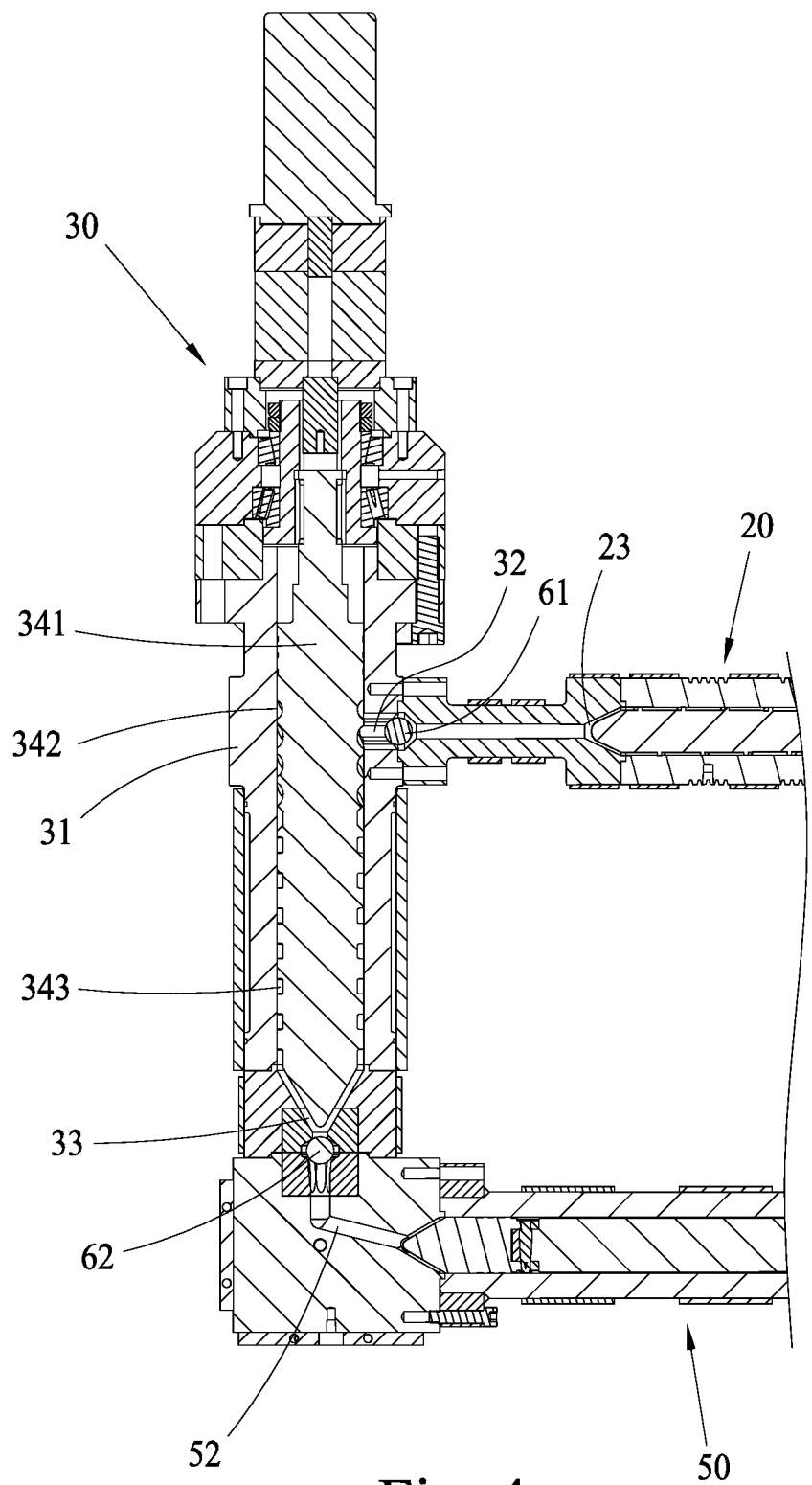
FIG. 4 is a cross-sectional view taken along the section line 4-4 in FIG. 1.
Figure 5:
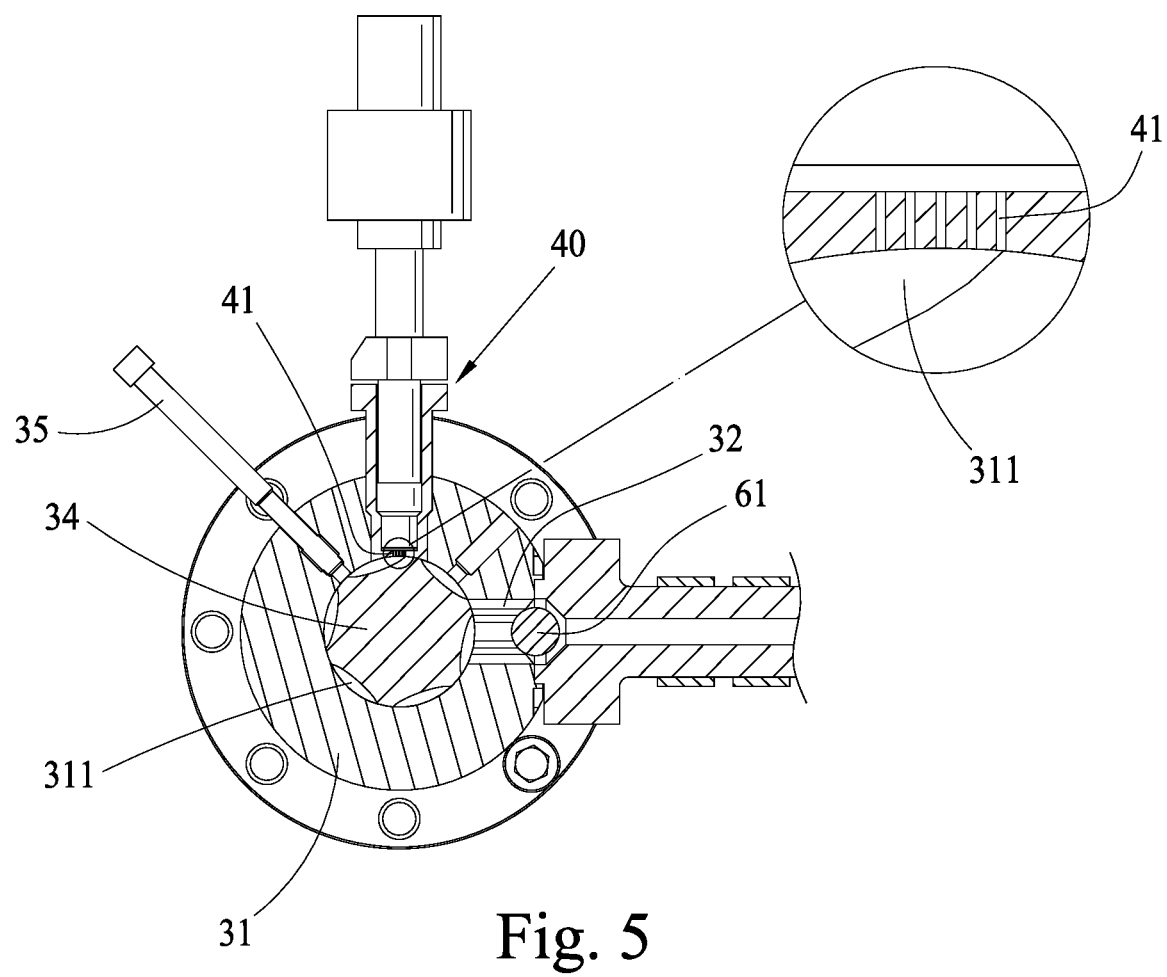
FIG. 5 is a cross-sectional view taken along the section line 5-5 in FIG. 1.

The mixing unit 30 is similar to a conventional injection pressing cartridge, extrusion pressing cartridge, or other blending device that is capable of achieving melt-mixing in which different fluids are mixed to form a homogenous solution. In the present embodiment, as shown in FIG. 3 to FIG. 5, the mixing unit 30 has a hollow mixing cartridge 31 in the shape of a cylinder, located outside the first discharging passage 23, wherein the side of the mixing cartridge 31 adjacent to one end of the cylindrical axis of the pressing cartridge 21 is fixedly connected to the discharging end member 26, so as to be indirectly and fixedly connected outside the other end of the cylindrical axis of the pressing cartridge 21. A second feeding passage 32 is disposed at the interconnection of the mixing cartridge 31 and the discharging end member 26, and communicates with the first discharging passage 23 through the discharging end member 26. A second discharging passage 33 is disposed at the other end of the cylindrical axis of the mixing cartridge 31, so as to be separated from the second feeding passage 32, and communicates with the second feeding passage 32 through the mixing cartridge inner space 311 of the mixing cartridge 31. A mixing rotor 34 is coaxial with the cylindrical axis of the mixing cartridge 31, rotatably disposed in the mixing cartridge 31, and located between the second feeding passage 32 and the second discharging passage 33. Therefore, after flowing out from the first discharging passage 23, the polymer melt is conveyed into the mixing cartridge inner space 311 through the second feeding passage 32, is agitated by rotation of the mixing rotor 34, and flows out of the mixing unit 30 through the second discharging passage 33.

The blowing agent supply unit 40 has a supply system (not shown) for turning inert gases such as carbon dioxide or nitrogen gas into supercritical fluids, and flowing passages for supercritical fluids are formed using pipeline technology such as pipes and valves. Because the supercritical state-forming technology and transfer technology of the gases are known in the prior art and are not technical features of the present invention, the descriptions thereof are omitted herein. Technologies related to the technical features of the present invention are described herein. As shown in FIG. 5, the blowing agent supply unit 40 has a plurality of hole-shaped gas transfer passages 41, disposed on a part of the mixing cartridge 31 adjacent to the discharging end member 26 and communicating with the mixing cartridge inner space 311, so as to form flow passages through which the supercritical fluid enters the mixing cartridge inner space 311 from the outside.

Through the configuration of the above components, a polymer melt obtained after hot-melting by the hot-melting unit 20 is forced into the mixing cartridge inner space 311 through the second feeding passage 32 by a pushing force provided by the pushing member 24, while an external supercritical fluid is also conveyed into the mixing cartridge inner space 311 through the gas transfer passages 41, such that the polymer melt and the supercritical fluid are agitated and mixed to form a homogenous single-phase solution in the mixing cartridge inner space 311 by rotation of the mixing rotor 34. The homogenous single-phase solution then flows out through the second discharging passage 33.

To enable the polymer melt and the supercritical fluid to mix uniformly in the mixing cartridge space 311, the mixing rotor 34 further includes a column-like body 341 in the shape of a straight cylinder, rotatably disposed in the mixing cartridge 31. A first groove portion 342 is annularly arranged on the periphery of the column-like body 341 at one end adjacent to the second feeding passage 32 and the gas transfer passages 41. A second groove portion 343 is annularly arranged on the periphery of the column-like body 341 at the other end adjacent to the second discharging passage 33. Therefore, when the column-like body 341 rotates, the polymer melt and the supercritical fluid are agitated by the first groove portion 342 and the second groove portion 343, so as to achieve a desired mixing effect.

Figure 6:
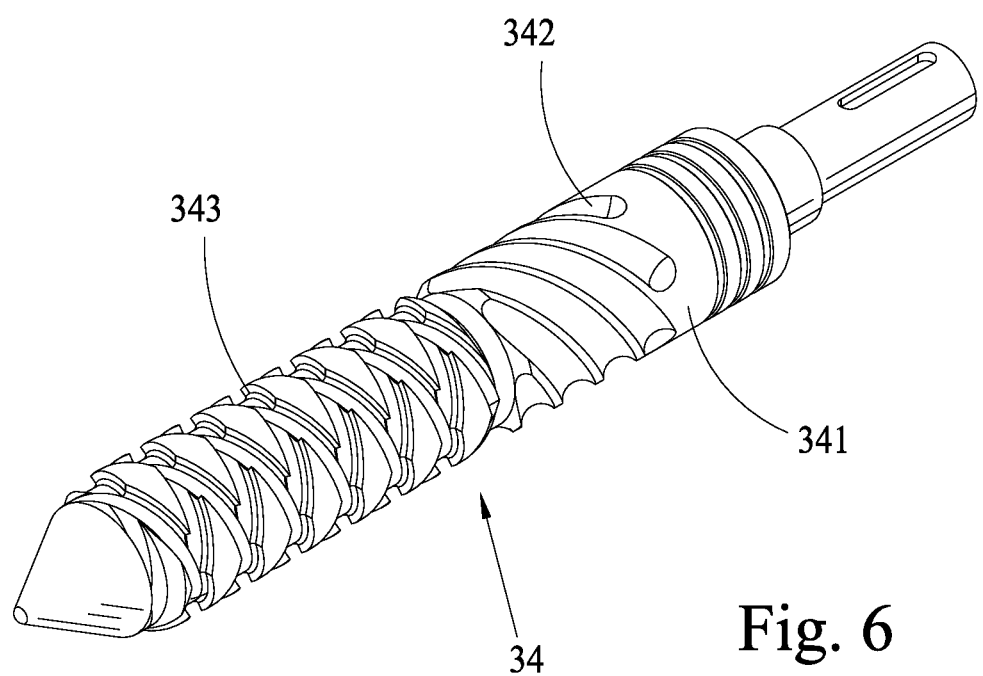
FIG. 6 is a perspective view of a mixing rotor of an extruding system according to one embodiment of the present invention.

Further, the first groove portion 342 and the second groove portion 343 may have a plurality of grooves of different curvatures, respectively, as shown in FIG. 6, such that a better mixing effect of the polymer melt and the supercritical fluid is achieved in the mixing cartridge space 311.

Figure 7:
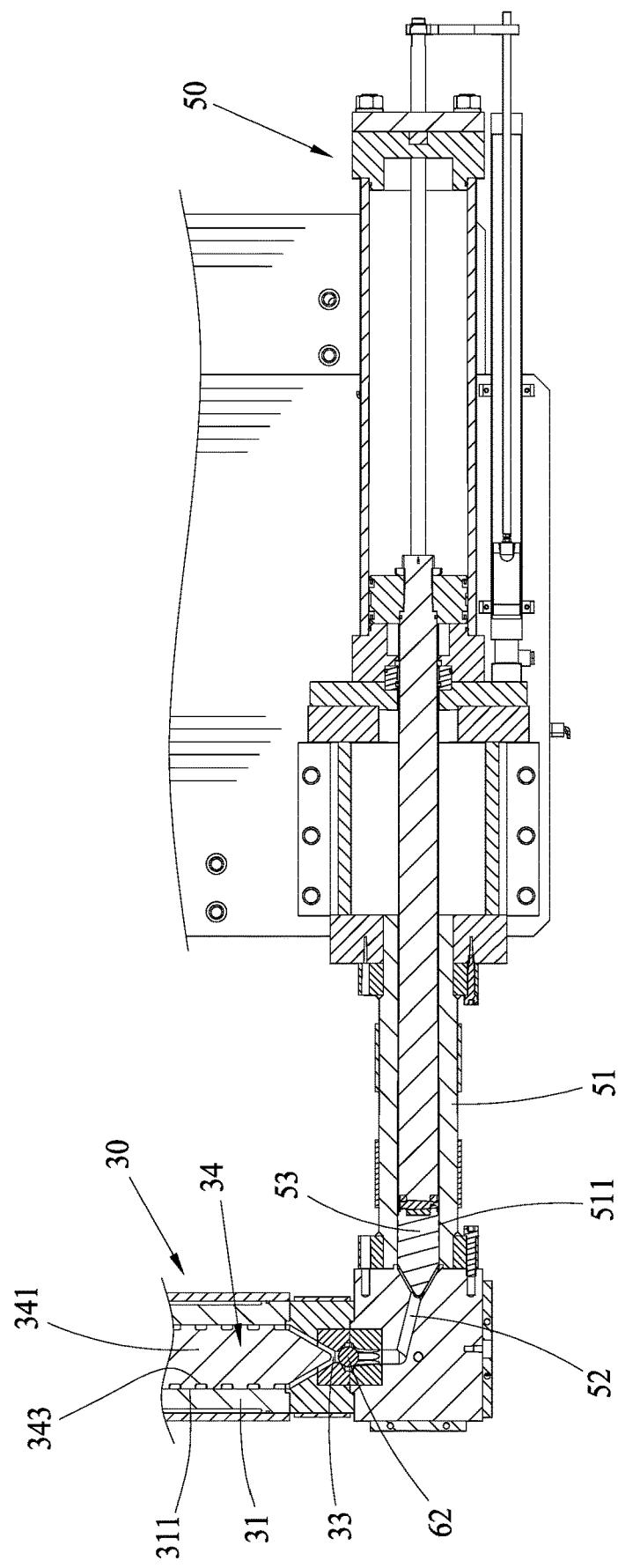
FIG. 7 is a cross-sectional view taken along the section line 7-7 in FIG. 1.

In addition, as shown in FIG. 7, the injection unit 50 is disposed outside the second discharging passage 33 of the mixing unit 30, wherein the injection unit 50 includes a hollow metering cartridge 51 generally in the shape of a column, a connecting passage 52 for communication with an inner space 511 of the metering cartridge 51 and the second discharging passage 33, and a plunger-shaped discharging member 53 slidably disposed in the inner space 511 of the metering cartridge 51 so as to reciprocate along the cylindrical axis of the metering cartridge 51. Therefore, the single-phase solution obtained by the mixing of the mixing unit 30 can be conveyed through the connecting passage into the inner space 511 of the metering cartridge 51 for measurement.

It should be noted that, conventionally, the single-phase solution is fed into an inner chamber of a mold for molding. In contrast, in the present embodiment the single-phase solution is fed into the injection unit 50 for measurement and a predetermined amount of the single-phase solution is then filled into an external mold through a feeding passage communicating with the connecting passage 52. However, the present invention is not limited thereto. In industrial utilization, the metering unit can be omitted, and the single-phase solution obtained after mixing by the mixing unit 30 can be fed directly into an external mold for molding. The feeding can be performed continuously or in batches, and can be performed by means of injection or extrusion. These implementations are all based on the main technical features of the present invention, and all fall within the implementing aspects of the present invention.

In the present disclosure, with the separation of the mixing unit 30 from the hot-melting unit 20, the rotation speed of the pushing member 24 and the rotation speed of the mixing rotor 34 do not interfere with each other, and the rotation speeds may be appropriately selected according to different purposes of hot-melting and mixing, so as to achieve an optimal hot-melting effect and an optimal mixing effect. Compared to the structure in the prior art, in which the mixing unit 30 and the hot-melting unit 20 are associated with each other, the configuration of the present invention has the advantage of greater flexibility in industrial utilization.

In addition, for the purposes of hot-melting, pressing and pushing a solid-polymer raw material, the pushing member 24 usually has a large groove depth to achieve the pressing and pushing effect on the polymer. In addition, for homogeneous mixing of the polymer melt and the supercritical fluid, it is advantageous to enable the polymer melt and the supercritical fluid to sufficiently flow relative to each other. Therefore, the groove depths of the first groove portion 342 and the second groove portion 343 of the mixing rotor 34 are smaller than the groove depth of the pushing member 24, to realize dispersion and micromixing and thereby achieve a better mixing effect. However, the groove depths and shapes may vary according to raw materials and conditions, and shall not be used to limit the present invention.

Further, to avoid undesired backflows between the mixing unit 30 and the hot-melting unit 20, as shown in FIG. 3 to FIG. 5, a spherical first check valve 61 is disposed between the first discharging passage 23 and the second feeding passage 32, so as to stop the mixture in the mixing unit 30 from reversely flowing from the second feeding passage 32 back to the first discharging passage 23.

Similarly, to avoid backflows between the mixing unit 30 and the injection unit 50, as shown in FIG. 4 and FIG. 7, a spherical second check valve 62 is disposed between the second discharging passage 33 and the connecting passage 52, so as to stop the mixture in the connecting passage 52 from reversely flowing back to the second discharging passage 33. Therefore, when the injection unit 50 deposits the measured mixture into an external mold through the connecting passage 52, the mixture can be prevented from reversely flowing into the mixing unit 30.

Moreover, to ascertain operating conditions such as pressure and temperature in the mixing unit 30, as shown in FIG. 5, the mixing unit 30 further has a pressure and/or temperature sensor 35 disposed in the mixing cartridge 31 and used to sense the pressure and/or temperature in the mixing cartridge inner space 311, for the purpose of control in industrial implementation.

Accordingly, the mechanism for mixing a supercritical fluid and a polymer raw material melt provided by the present invention achieves separation of the hot-melting and mixing processes in industrial utilization, resulting in convenience in use, and enables easy homogeneous mixing of a single-phase solution, providing a molded foam with a desired forming quality.

Figure 8:
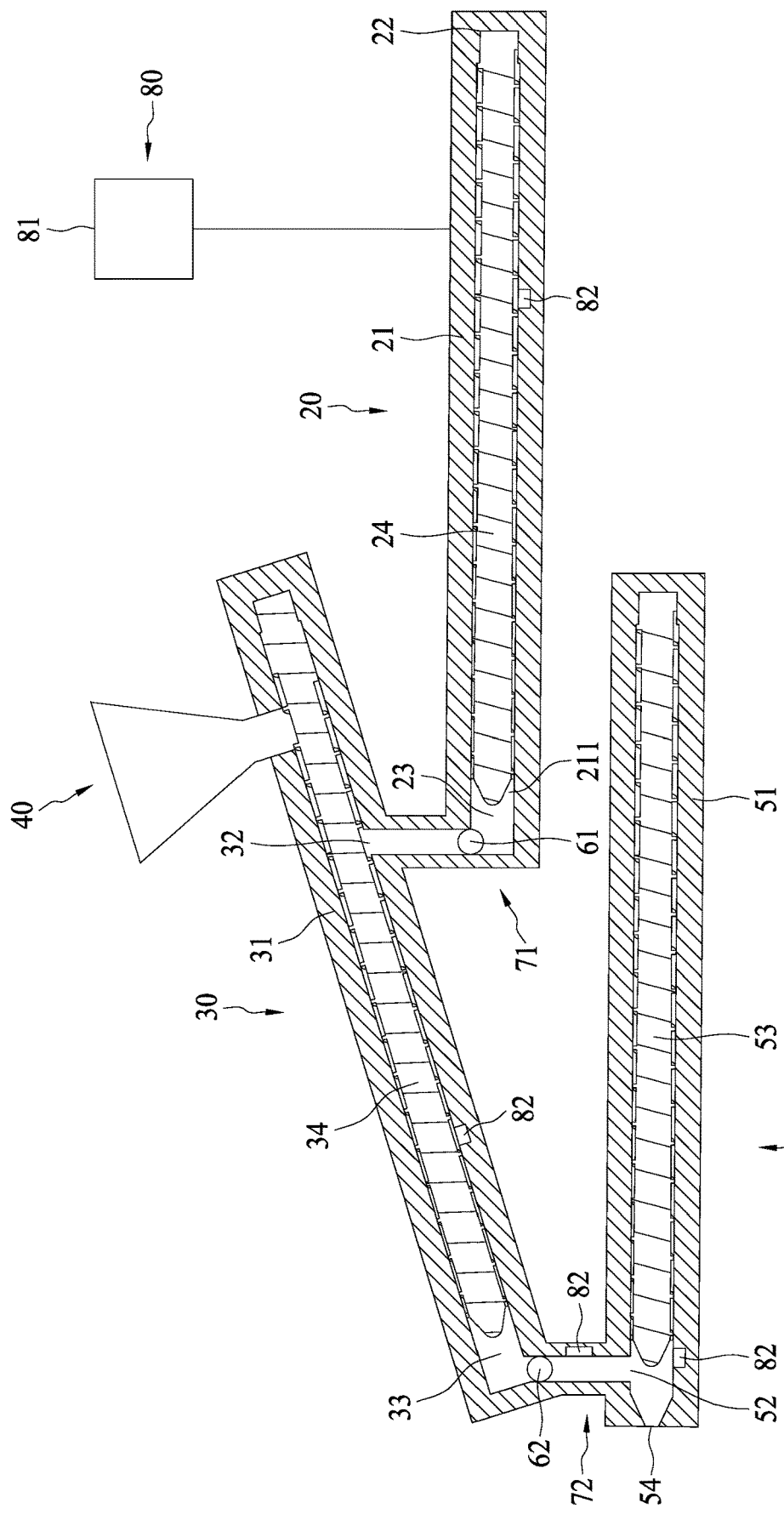
FIG. 8 is a schematic diagram of an extruding system according to one embodiment of the present invention.

FIG. 8 illustrates an embodiment of an extruding system. FIG. 8 is a schematic diagram view of the extruding system according to aspects of the present disclosure in some embodiments. The extruding system includes a melting unit 20, a mixing unit 30, a blowing agent supply unit 40, an injection unit 50, a first flow control element 61, a second flow control element 62, and a monitoring module 80.

Figure 9:
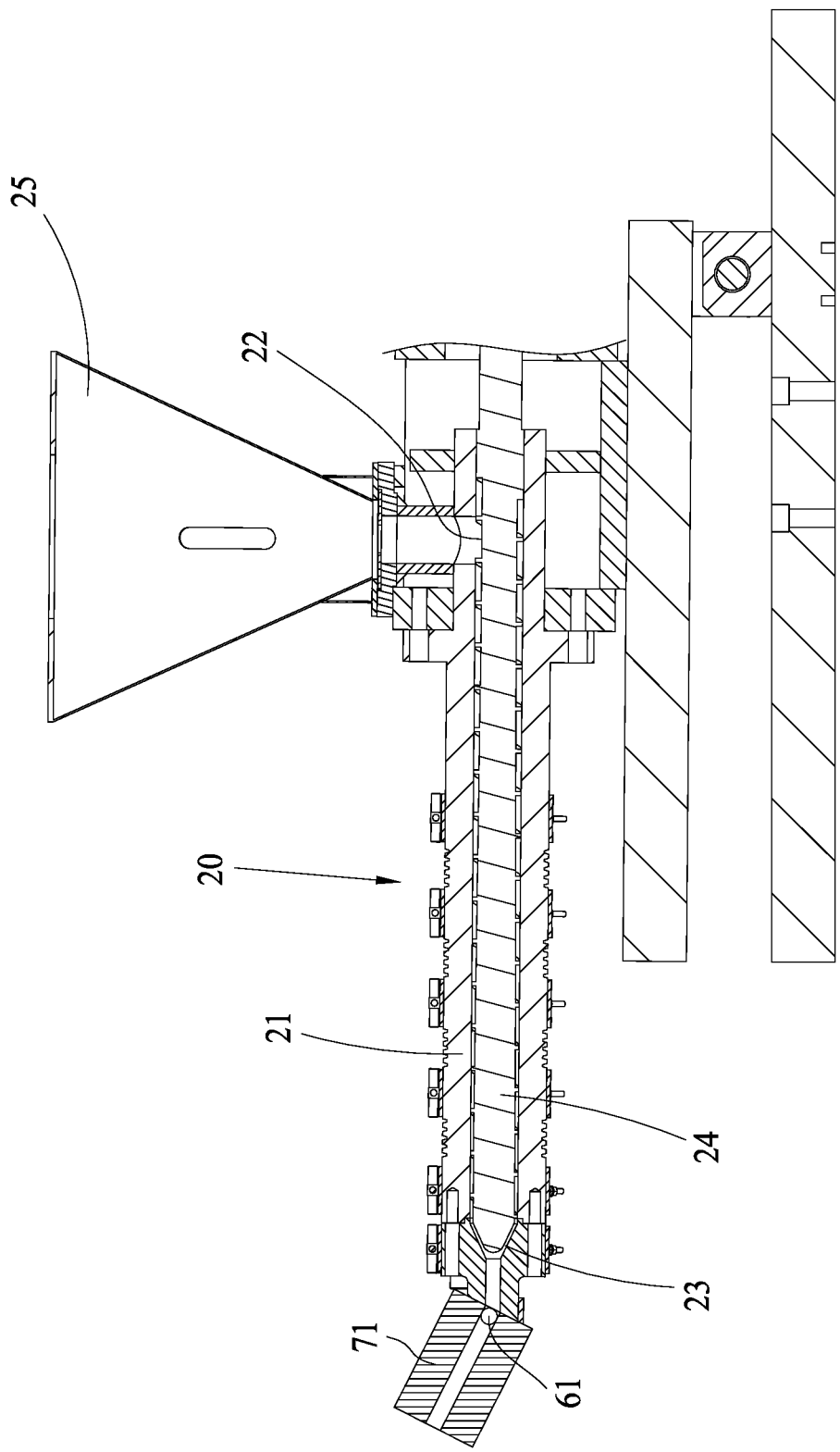
FIG. 9 is a cross-sectional view of a portion of the extruding system in FIG. 8 according to one embodiment of the present invention.
Figure 10:
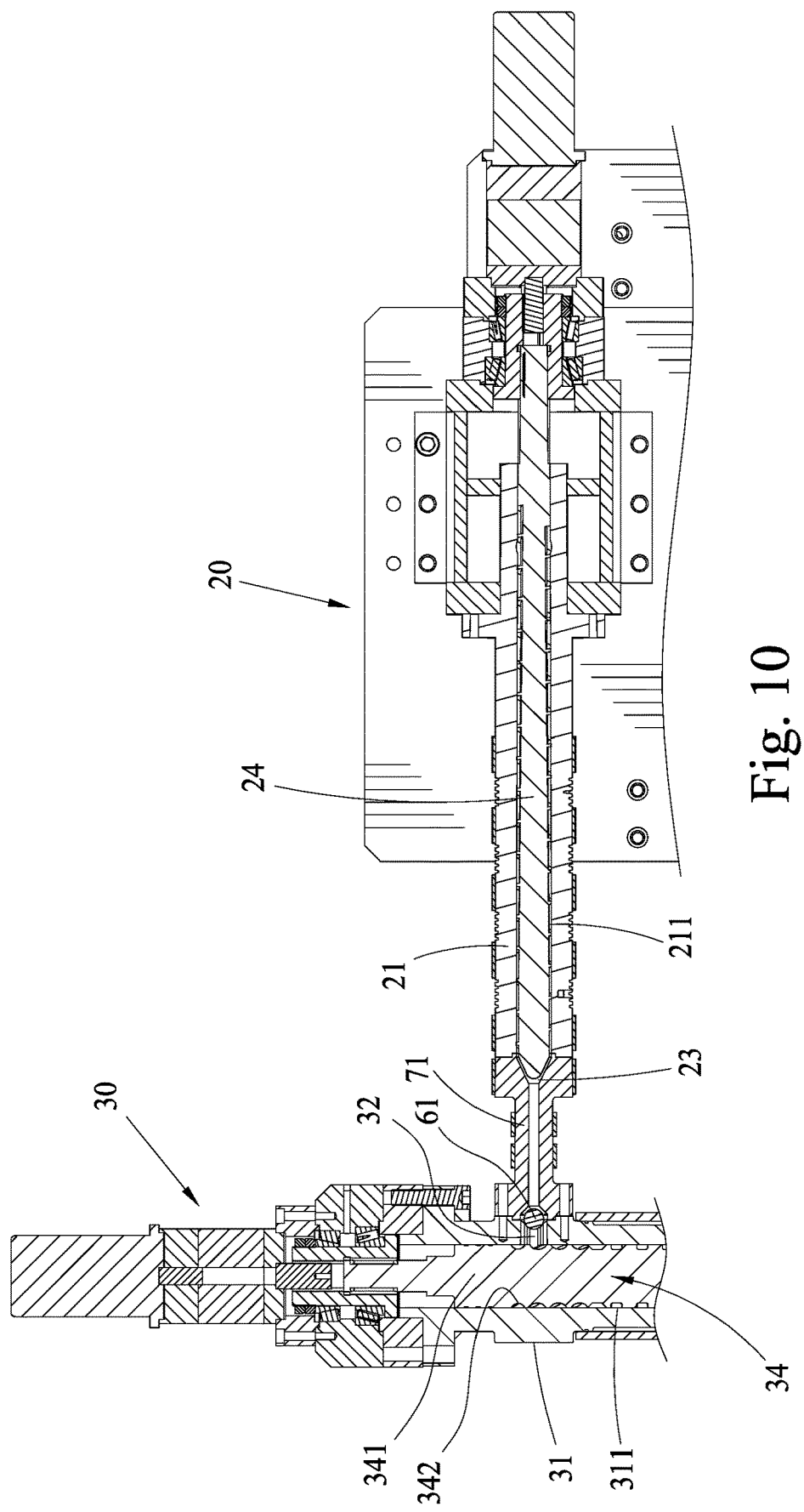
FIG. 10 is a cross-sectional view of a portion of the extruding system in FIG. 8 according to one embodiment of the present invention.

FIGS. 9 and 10 are cross-sectional views of the extruding system shown in FIG. 8. In some embodiments, referring to FIGS. 8 to 10, the melting unit 20 is configured to convey a polymeric material. In some embodiments, the melting unit 20 includes a pressing cartridge 21, a first feeding passage 22, a first discharging passage 23, and a pushing member 24. In some embodiments, the melting unit 20 further includes a feeding hopper 25.

In some embodiments, the first feeding passage 22 and the first discharging passage 23 are respectively disposed at two ends of the pressing cartridge 21. In some embodiments, the first feeding passage 22 communicates with an inner space 211 of the pressing cartridge 21, and the first discharging passage 23 communicates with an external space of the pressing cartridge 21, wherein the first feeding passage 22 is configured to deliver the polymeric material to the inner space 211 of the pressing cartridge 21.

The pushing member 24 is configured to convey the polymeric material from the first feeding passage 22 to the first discharging passage 23. In some embodiments, the pushing member 24 is disposed in the inner space 211 of the pressing cartridge 21. In some embodiments, the pushing member 24 is disposed in the inner space 211 of the pressing cartridge 21 between the first feeding passage 22 and the first discharging passage 23, and is used to force the polymeric material toward the first discharging passage 23. In some embodiments, the pushing member 24 is rotatable relative to the pressing cartridge 21. In some embodiments, the polymeric material is conveyed from the first feeding passage 22 to the first discharging passage 23 by rotation of the pushing member 24. In some embodiments, the pushing member 24 is immovable in a direction parallel to the longitudinal axis of the pressing cartridge 21.

The feeding hopper 25 is configured to deliver a polymeric material to the inner space 211 of the pressing cartridge 21 through the first feeding passage 22.

The mixing unit 30 is configured to receive the polymeric material from the melting unit 20 and configured to mix the polymeric material with a blowing agent and to form a mixture of the polymeric material and the blowing agent. The mixing unit 30 includes a hollow mixing cartridge 31, a second feeding passage 32, a second discharging passage 33, and a mixing rotor 34.

The second feeding passage 32 and the second discharging passage 33 are respectively disposed at two ends of the mixing cartridge 31. In some embodiments, the second feeding passage 32 is configured to deliver the polymeric material. In some embodiments, the second discharging passage 33 is configured to discharge the mixture.

The mixing rotor 34 is configured to mix the polymeric material with the blowing agent to form a mixture in the mixing cartridge 31. In some embodiments, the mixing rotor 34 is disposed in the mixing cartridge 31. In some embodiments, the mixing rotor 34 is disposed in the mixing cartridge 31 between the second feeding passage 32 and the second discharging passage 33, so as to agitate the mixture in the mixing cartridge. The mixing rotor 34 is rotatable to mix the polymeric material with the blowing agent and to convey the mixture of the polymeric material and the blowing agent from the second feeding passage 32 to the second discharging passage 33. In some embodiments, the mixing rotor 34 is immovable in a direction parallel to the longitudinal axis of the mixing cartridge 31.

In some embodiments, the melting unit 20 includes a hollow pressing cartridge 21 configured to accommodate the polymeric material and having a first pressure, and the mixing unit 30 includes a hollow mixing cartridge 31 having a second pressure. In some embodiments, in order to prevent backflow, the first pressure is greater than the second pressure. In some embodiments, the polymeric material is drawn from the melting unit 20 toward the mixing unit 30 by the difference between the first pressure and the second pressure.

The blowing agent supply unit 40 is connected to the mixing unit 30 and configured to convey the blowing agent into the mixing unit 30. In some embodiments, the blowing agent supply unit 40 is positioned between the first flow control element 61 and the second flow control element 62. In some embodiments, the blowing agent supply unit 40 is disposed proximal to the first flow control element 61 and distal to the second flow control element 62.

In some embodiments, a blowing agent source (not shown) is connected to the blowing agent supply unit 40 and is configured to supply any type of blowing agent known to those of ordinary skill in the art. In some embodiments, the blowing agent is a physical or chemical additive that releases gas during the heating process. The physical blowing agent includes an atmospheric gas (e.g., nitrogen or carbon dioxide), a hydrocarbon, a chlorofluorocarbon, a noble gas, or a combination thereof. The blowing agent may be supplied in any flowable physical state, for example, a gas, a liquid, or a supercritical fluid. In some embodiments, the blowing agent is in the supercritical fluid state after being introduced into the mixing unit 30 by the blowing agent supply unit 40.

In some embodiments, the first flow control element 61 is disposed at a first port 71 that connects the melting unit 20 to the mixing unit 30. The first port 71 is configured to introduce the polymeric material from the melting unit 20 into the mixing unit 30. The first port 71 is located between the melting unit 20 and the mixing unit 30. In some embodiments, the first port 71 is configured to introduce the polymeric material from the pressing cartridge 21 of the melting unit 20 into the mixing cartridge 31 of the mixing unit 30. In some embodiments, the polymeric material can be conveyed and/or drawn from the melting unit 20 to the mixing unit 30 through the first port 71 by a pressure difference between the first pressure and the second pressure.

In some embodiments, the first flow control element 61 is disposed between the melting unit 20 and the mixing unit 30 and is configured to control flow of the polymeric material from the melting unit 20 to the mixing unit 30. The first flow control element 61 may be a valve, a movable cover or the like.

In some embodiments, the first flow control element 61 is configured to switch between an open configuration and a closed configuration. The open configuration of the first flow control element 61 allows the polymeric material to flow from the melting unit 20 into the mixing unit 30, and the closed configuration of the first flow control element 61 prevents the polymeric material from flowing from the mixing unit 30 back to the melting unit 20.

In some embodiments, the first flow control element 61 is configured to maintain a pressure difference between the melting unit 20 and the mixing unit 30. In some embodiments, the first flow control element 61 is configured to maintain a pressure difference between the melting unit 20 and the mixing unit 30 by switching between the open configuration and the closed configuration, so that the polymeric material is not able to flow from the mixing cartridge 31 of the mixing unit 30 back to the pressing cartridge 21 of the melting unit 20. In some embodiments, the first flow control element 61 is configured to adjust the first pressure and/or the second pressure in order to maintain the pressure difference between the first pressure and the second pressure.

Figure 11:
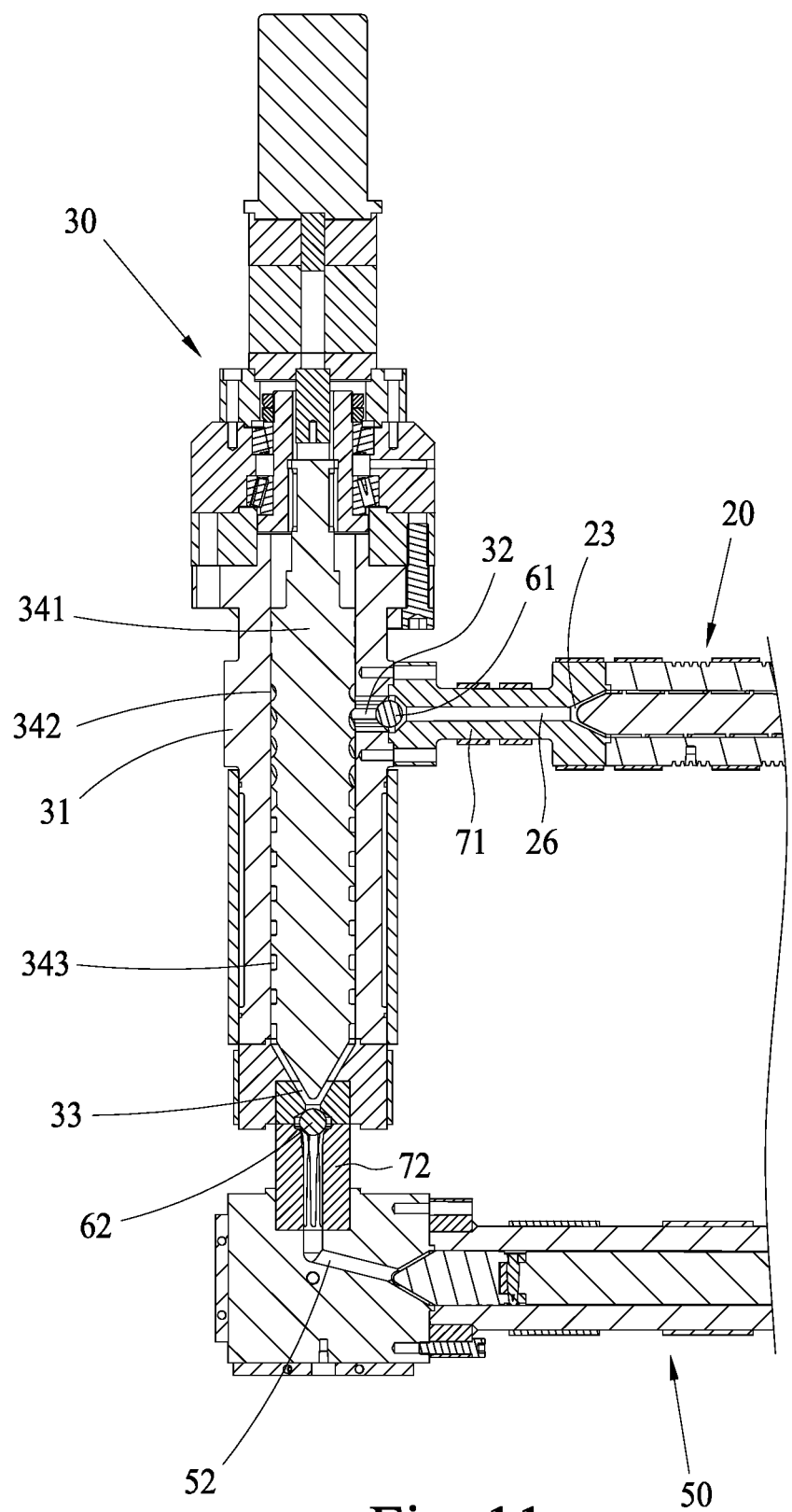
FIG. 11 is a cross-sectional view of a portion of the extruding system in FIG. 8 according to one embodiment of the present invention.
Figure 12:
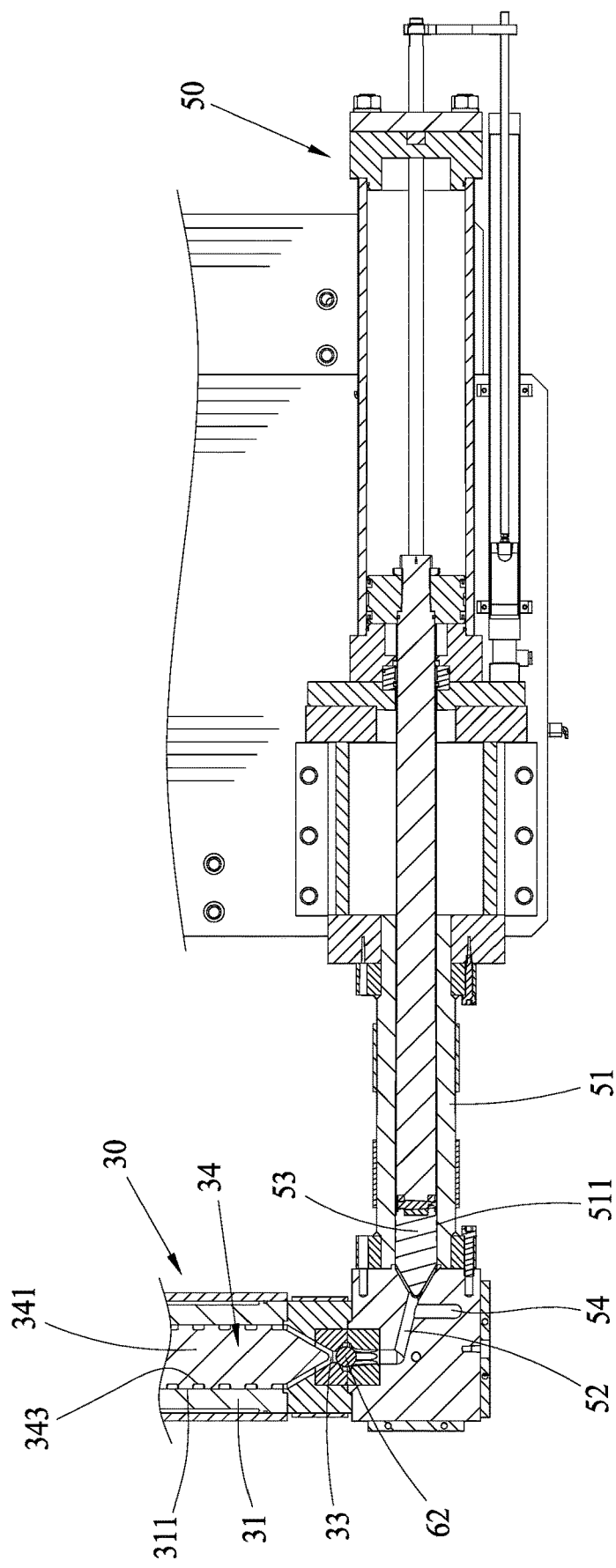
FIG. 12 is a cross-sectional view of a portion of the extruding system in FIG. 8 according to one embodiment of the present invention.

FIGS. 11 and 12 are cross-sectional views of the extruding system shown in FIG. 8. In some embodiments, referring to FIGS. 8, 11 and 12, the injection unit 50 is configured to receive the mixture discharged from the second discharging passage 33 of the mixing unit 30 and to discharge the mixture out of the injection unit 50. In some embodiments, the injection unit 50 includes a hollow metering cartridge 51 configured to accommodate the mixture. The metering cartridge 51 has a hollow inner space 511, wherein the inner space 511 is in communication with the second discharging passage 33 and configured to accommodate the mixture. The injection unit 50 further includes a connecting passage 52 in communication with the inner space 511 of the metering cartridge 51 and a discharging member 53 slidably disposed in the inner space 511 of the metering cartridge 51 and configured to discharge the mixture out of the metering cartridge 51 through an outlet 54.

In some embodiments, a mold (not shown) is connected to the outlet 54. In some embodiments, the discharging member 53 is movable in a direction parallel to the longitudinal axis of the metering cartridge 51 to inject the mixture accumulated in the metering cartridge 51 into the mold through the outlet 54. The mixture is injected from the metering cartridge 51 into the mold by a pushing force from the discharging member 53. In some embodiments, the discharging member 53 is not rotatable relative to the metering cartridge 51.

In some embodiments, the metering cartridge 51 has a third pressure. In some embodiments, in order to prevent backflow, the second pressure of the mixing cartridge 31 is greater than the third pressure.

In some embodiments, the second flow control element 62 is disposed at a second port 72 that connects the mixing unit 30 to the injection unit 50. The second port 72 is configured to introduce the mixture from the mixing unit 30 into the injection unit 50. The second port 72 is located between the mixing unit 30 and the injection unit 50. In some embodiments, the second port 72 is configured to introduce the mixture from the mixing cartridge 31 of the mixing unit 30 into the metering cartridge 51 of the injection unit 50. In some embodiments, the mixture can be conveyed and/or drawn from the mixing unit 30 to the injection unit 50 through the second port 72 by a pressure difference between the second pressure and the third pressure.

In some embodiments, the second flow control element 62 is disposed between the mixing unit 30 and the injection unit 50 and is configured to control flow of the mixture from the mixing unit 30 to the injection unit 50. The second flow control element 62 may be a valve, a movable cover or the like.

In some embodiments, the second flow control element 62 is configured to switch between an open configuration and a closed configuration, wherein the open configuration allows the mixture to flow from the mixing unit 30 into the injection unit 50 and the closed configuration prevents the mixture from flowing from the injection unit 50 back to the mixing unit 30.

In some embodiments, the second flow control element 62 is configured to maintain a pressure difference between the mixing unit 30 and the injection unit 50. In some embodiments, the second flow control element 62 is configured to maintain a pressure difference between the mixing unit 30 and the injection unit 50 by switching between the open configuration and the closed configuration, so that the mixture is not able to flow from the metering cartridge 51 of the injection unit 50 back to the mixing cartridge 31 of the mixing unit 30. In some embodiments, the second flow control element 62 is configured to adjust the second pressure and/or the third pressure in order to maintain the pressure difference between the second pressure and the third pressure.

Referring back to FIG. 8, the monitoring module 80 is configured to monitor the extruding system in real time. In some embodiments, the monitoring module 80 includes a central processor 81 and a sensor 82 electrically connected to or communicable with the central processor 81. In some embodiments, a plurality of sensors 82 are placed throughout the extruding system and configured to sense at least one processing condition (e.g., a flow rate or viscosity of the polymeric material along the melting unit 20, an amount of the mixture accumulated in the injection unit 50, the first pressure inside the melting unit 20, the second pressure inside the mixing unit 30, the third pressure inside the injection unit 50, the pressure difference between the first pressure and the second pressure, the pressure difference between the second pressure and the third pressure, temperatures at each unit, rotational speeds of the pushing member 24 and the mixing rotor 34, or flow rate and amount of the blowing agent through the blowing agent inlet 40) at a predetermined position of the extruding system (e.g., the melting unit 20, the mixing unit 30, the injection unit 50, the blowing agent inlet 40, the first port 71, the second port 72, the outlet 54, or the first and second flow control elements 61, 62). For example, at least one sensor 82 is installed at each unit for sensing the processing condition at the corresponding unit. In some embodiments, the sensor 82 is configured to detect the processing condition and transmit a signal or data based on the processing condition detected to the central processor 81 for further analysis. The number of sensors 82 may be adjusted according to requirements.

In some embodiments, the monitoring module 80 can automatically monitor and instantly adjust the processing conditions at the corresponding positions of the extruding system in accordance with the processing conditions sensed by the sensors 82 and/or the analysis of the central processor 81. The sensor 82 is not limited to any particular type, as long as it can sense the processing condition and provide information after sensing. The central processor 81 changes the processing condition with the information, so as to adjust the processing condition in each unit, in such a manner that the mixture thus obtained has the desired predetermined property.

In some embodiments, the pressure difference between the first pressure inside the melting unit 20 and the second pressure inside the mixing unit 30 is sensed by the sensors 82 installed in the melting unit 20, the first port 71, the blowing agent inlet unit 40, and the mixing unit 30. As such, the monitoring module 80 can automatically monitor and instantly adjust the conveyance of the polymeric material between the melting unit 20 and mixing unit 30, such as the conveyance rate, the conveyance duration, configurations of the first flow control element 61, rotational speed of the pushing member 24, etc.

In some embodiments, the sensor 82 at the mixing unit 30 senses the mixing condition of the polymeric material and the blowing agent, such as the amounts of the blowing agent and the polymeric material, and the flow rates of the blowing agent and the polymeric material. As such, the monitoring module 80 can automatically monitor and instantly adjust the conveyance of the polymeric material from the melting unit 20 to the mixing unit 30, configurations of the blowing agent inlet, flow rate of the blowing agent, rotational speed of the mixing rotor 34, etc.

In some embodiments, the pressure difference between the second pressure inside the mixing unit 30 and the third pressure inside the injection unit 50 is sensed by the sensors 82 installed in the mixing unit 30, the second port 72, and the injection unit 50. As such, the monitoring module 80 can automatically monitor and instantly adjust the conveyance of the mixture from the mixing unit 30 to the injection unit 50, such as the conveyance rate, the conveyance duration, configurations of the second flow control element 62, etc.

In some embodiments, the pressure of the injection unit 50 is sensed by the sensor 82 installed in the injection unit 50. For example, when the sensor 82 senses that the pressure of the injection unit 50 exceeds a predetermined level, the central processor 81 may decrease the pushing force of the discharging member 53 applied to the mixture accumulated in the metering cartridge 51. When the sensor 82 senses that the pressure of the injection unit 50 is below the predetermined level, the central processor 81 may increase the pushing force of the discharging member 53 or stop the injection.

In some embodiments, an amount of the mixture discharged from the injection unit 50 can be sensed by the sensor 82 at the outlet 54, and the amount of the mixture can be instantly adjusted to a desirable amount. For example, when the sensor 82 senses that the discharged amount of the mixture is insufficient, the central processor 81 may transmit a signal to the outlet 54 to increase duration of open configuration of the outlet 54 in accordance with the discharged amounted sensed by the sensor 82.

Figure 13:
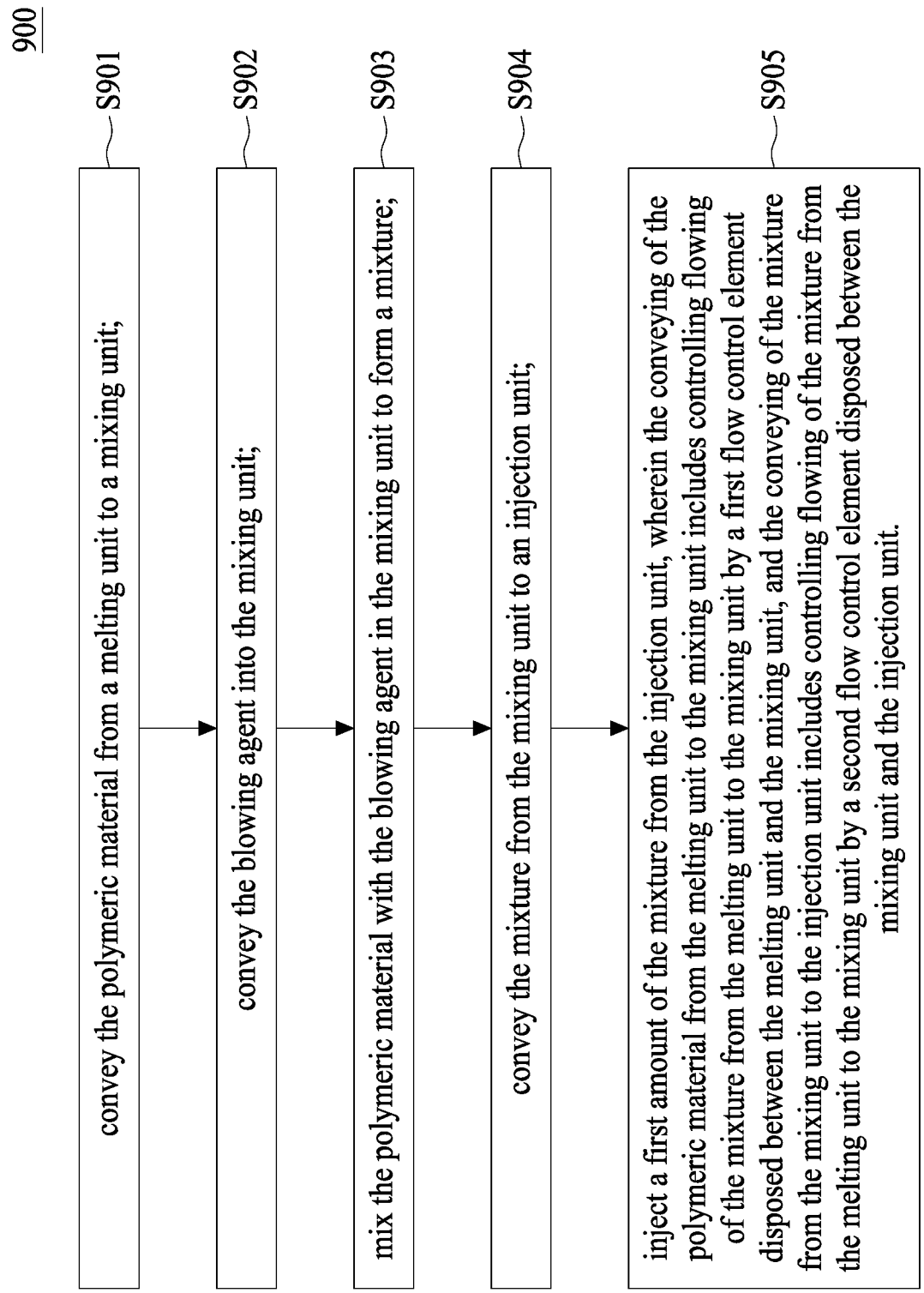
FIG. 13 is a flowchart illustrating a method of extruding a mixture of a polymeric material and a blowing agent according to one embodiment of the present invention.

In the present disclosure, a method of extruding a mixture of a polymeric material and a blowing agent is disclosed. In some embodiments, an extrusion is performed by the method. The method includes a number of operations and the description and illustrations are not deemed as a limitation of the sequence of the operations. FIG. 13 is a flowchart illustrating a method of extruding a mixture of a polymeric material and a blowing agent according to one embodiment of the present invention. In some embodiments, as shown in FIG. 13, the method of injection molding 900 includes the following steps.

Step 901 includes conveying the polymeric material from a melting unit to a mixing unit.

Step 902 includes conveying the blowing agent into a mixing unit.

Step 903 includes mixing the polymeric material with the blowing agent in the mixing unit to form the mixture.

Step 904 includes conveying the mixture from the mixing unit to an injection unit.

Step 905 includes discharging a first amount of the mixture from the injection unit.

The conveyance of the polymeric material from the melting unit to the mixing unit includes controlling flow of the polymeric material from the melting unit to the mixing unit by a first flow control element disposed between the melting unit and the mixing unit. The conveyance of the mixture from the mixing unit to the injection unit includes controlling flow of the mixture from the mixing unit to the injection unit by a second flow control element disposed between the mixing unit and the injection unit.

The method 900 is not limited to the above-mentioned embodiments. In some embodiments, the method of injection molding 900 uses any of the above-mentioned extruding systems as shown in FIGS. 8 to 12.

In some embodiments, the method of extruding a mixture of a polymeric material and a blowing agent 900 includes step 901, which includes conveying the polymeric material from a melting unit 20 to a mixing unit 30. Step 901 further includes controlling flow of the polymeric material from the melting unit 20 to the mixing unit 30 by a first flow control element 61 disposed between the melting unit 20 and the mixing unit 30.

In some embodiments, as shown in FIG. 9, the polymeric material is conveyed through a feeding hopper 25 into an inner space 211 of a pressing cartridge 21 of the melting unit 20. In some embodiments, the polymeric material is conveyed from a first feeding passage 22 to a first discharging passage 23 of the melting unit 20 by rotation of a pushing member 24 disposed in the inner space 211 of the pressing cartridge 21. In some embodiments, the pushing member 24 is immovable in a direction parallel to the longitudinal axis of the pressing cartridge 21.

In some embodiments, the polymeric material is conveyed from a first feeding passage 22 of the melting unit 20 to a second feeding passage 32 of the mixing unit 30 by rotation of a pushing member 24 disposed in the inner space 211 of the pressing cartridge 21. In some embodiments, the second feeding passage 32 is disposed at one end of a hollow mixing cartridge 31.

In some embodiments, a sensor 82 of a monitoring module 80 senses that a first pressure inside the melting unit 20 is greater than a second pressure inside the mixing unit 30. In some embodiments, the sensor 82 continuously senses the pressure in the melting unit 20 and the pressure in the mixing unit 30, and transmits a signal or data based on the processing condition detected to a central processor 81 for further analysis.

In some embodiments, a pressure difference between the melting unit 20 and the mixing unit 30 is generated. In some embodiments, the first flow control element 61 maintains the pressure difference. In some embodiments, the first flow control element 61 is in an open configuration while the polymeric material is conveyed from the melting unit 20 to the mixing unit 30. In some embodiments, the first flow control element 61 is in a closed configuration when the first pressure is similar to the second pressure.

In some embodiments, the polymeric material is conveyed from the melting unit 20 to the mixing unit 30 through a first port 71 located between and connecting the melting unit 20 and the mixing unit 30. In some embodiments, the first flow control element 61 is disposed at the first port 71. In some embodiments, the polymeric material is conveyed and/or drawn from the melting unit 20 to the mixing unit 30 through the first port 71 by a pressure difference between the first pressure and the second pressure.

In some embodiments, the method 900 includes step 902, which includes conveying the blowing agent into the mixing unit 30.

In some embodiments, the blowing agent is conveyed through a blowing agent supply unit 40 into the mixing unit 30.

In some embodiments, the method 900 includes step 903, which includes mixing the polymeric material with the blowing agent in the mixing unit 30 to form a mixture. In some embodiments, referring to FIG. 10, the polymeric material and the blowing agent are mixed in a hollow mixing cartridge 31 of the mixing unit 30. In some embodiments, the polymeric material and the blowing agent are mixed by rotation of a mixing rotor 34 disposed in the mixing cartridge 31. In some embodiments, the mixing rotor 34 is immovable in a direction parallel to the longitudinal axis of the mixing cartridge 31.

In some embodiments, mixing the polymeric material with the blowing agent and conveying the mixture of the polymeric material and the blowing agent from the second feeding passage 32 to a second discharging passage 33 is conducted by rotation of the mixing rotor 34. The second feeding passage 32 and the second discharging passage 33 are respectively disposed at two opposite ends of the mixing cartridge 31 of the mixing unit 30.

In some embodiments, the sensor 82 senses the processing conditions of the mixing, such as the second pressure inside the mixing unit 30, the temperature of the mixing unit 30, rotational speed of the mixing rotor 34, and rate and amount of the blowing agent flowing through the blowing agent inlet 40, and the sensor 82 transmits a signal or data based on the processing condition detected to the central processor 81 for further analysis.

In some embodiments, the method 900 includes step 904, which includes conveying the mixture from the mixing unit 30 to an injection unit 50. Step 904 further includes controlling flow of the mixture from the mixing unit 30 to the injection unit 50 by a second flow control element 62 disposed between the mixing unit 30 and the injection unit 50.

In some embodiments, as shown in FIG. 11, the mixture is conveyed from the second discharging passage 33 into an inner space 511 of a hollow metering cartridge 51 of the injection unit 50. In some embodiments, the polymeric material is conveyed from the second discharging passage 33 of the mixing unit 30 to an inner space 511 of the metering cartridge 51 of the injection unit 50 through a connecting passage 52 by rotation of the mixing rotor 34 disposed in the mixing cartridge 31. In some embodiments, the connecting passage 52 is disposed at one end of the metering cartridge 51.

In some embodiments, the sensor 82 of the monitoring module 80 senses that the second pressure inside the mixing unit 30 is greater than a third pressure inside the injection unit 50. In some embodiments, the sensor 82 continuously senses the pressures in the mixing unit 30 and the injection unit 50, and transmits a signal or data based on the processing condition detected to a central processor 81 for further analysis.

In some embodiments, a pressure difference between the mixing unit 30 and the injection unit 50 is generated. In some embodiments, the second flow control element 62 maintains the pressure difference. In some embodiments, the second flow control element 62 is in an open configuration while the mixture is conveyed from the mixing unit 30 to the injection unit 50. In some embodiments, the second flow control element 62 is in a closed configuration when the second pressure is similar to the third pressure.

In some embodiments, the mixture is conveyed from the mixing unit 30 to the injection unit 50 through a second port 72 located between and connecting the mixing unit 30 and the injection unit 50. In some embodiments, the second flow control element 62 is disposed at the second port 72. In some embodiments, the mixture is conveyed and/or drawn from the mixing unit 30 to the injection unit 50 through the second port 72 by a pressure difference between the second pressure and the third pressure.

In some embodiments, the mixture is conveyed from the mixing unit 30 to the injection unit 50 and accumulates in the inner space 511 of the metering cartridge 51 of the injection unit 50.

In some embodiments, the method 900 includes step 905, which includes discharging a first amount of the mixture from the injection unit 50.

As illustrated in FIG. 12, in some embodiments, a pushing force provided toward an outlet 54 forces the first amount of the mixture out of the injection unit 50. In some embodiments, the mixture is forced from the injection unit 50 through an outlet 54. In some embodiments, before the mixture is forced from the injection unit 50, the extruding system is moved to a predetermined position, the outlet 54 engages with a mold, and the mixture is discharged from the injection unit 50. In some embodiments, a discharging member 53 slidably disposed in the inner space 511 of the metering cartridge 51 discharges the first amount of the mixture from the injection unit 50. In some embodiments, the movement of the discharging member 53 in a direction parallel to the longitudinal axis of the metering cartridge 51 discharges the mixture.

In some embodiments, the first amount of the mixture is determined by the monitoring module 80. In some embodiments, the sensor 82 continuously senses the processing conditions in the injection unit 50, and transmits a signal or data based on the processing condition detected to a central processor 81 for further analysis, such as determining the first amount of the mixture and the duration of the injection.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. A method of extruding a mixture of a polymeric material and a blowing agent, comprising:
    conveying the polymeric material from a melting unit to a mixing unit by rotating a pushing member in a hollow pressing cartridge of the melting unit, wherein the pushing member is immovable in a direction parallel to a longitudinal axis of the hollow pressing cartridge, and has a first groove annularly arranged over a surface of the pushing member, the first groove is in a first depth;
    conveying the blowing agent into the mixing unit;
    mixing the polymeric material with the blowing agent in the mixing unit to form the mixture by axially rotating a mixing rotor in a hollow mixing cartridge of the mixing unit, wherein the mixing rotor is immovable in a direction parallel to a longitudinal axis of the hollow mixing cartridge, the mixing rotor includes a first groove portion having a second groove and a second groove portion having a third groove, the first groove portion is arranged at one end adjacent to the melting unit, the second groove portion is annularly arranged at the other end adjacent to the injection unit, and a groove depth of the second groove and a groove depth the third groove are different from the first depth;
    conveying the mixture from the mixing unit to an injection unit, wherein the injection unit connects to the mixing unit, the injection unit includes a hollow metering cartridge configured to accommodate the mixture and a discharging member slidably disposed in the hollow metering cartridge, the discharging member is movable in a direction parallel to a longitudinal axis of the hollow metering cartridge and is not axially rotatable relative to the hollow metering cartridge; and
    moving the discharging member in a direction parallel to a longitudinal axis of the hollow metering cartridge to discharge a first amount of the mixture from the injection unit,
    wherein the conveying of the polymeric material from the melting unit to the mixing unit includes controlling flow of the polymeric material from the melting unit to the mixing unit by a first flow control element disposed between the melting unit and the mixing unit, and the conveying of the mixture from the mixing unit to the injection unit includes controlling flow of the mixture from the mixing unit to the injection unit by a second flow control element disposed between the mixing unit and the injection unit.

2. The method of claim 1, further comprising generating a pressure difference between the melting unit and the mixing unit.

3. The method of claim 1, further comprising generating a pressure difference between the mixing unit and the injection unit.

4. The method of claim 1, further comprising monitoring the melting unit, the mixing unit, the injection unit in real time.

5. An extruding system, comprising:
    a melting unit configured to convey a polymeric material, wherein the melting unit includes a hollow pressing cartridge configured to accommodate the polymeric material and a pushing member rotatable within the hollow pressing cartridge;
    a mixing unit configured to receive the polymeric material from the melting unit and configured to mix the polymeric material with a blowing agent and to form a mixture of the polymeric material and the blowing agent, wherein the mixing unit includes a hollow mixing cartridge and a mixing rotor rotatably disposed in the hollow mixing cartridge, the mixing rotor is immovable in a direction parallel to a longitudinal axis of the hollow mixing cartridge, is axially rotatable relative to the hollow mixing cartridge;
    a blowing agent supply unit connected to the mixing unit and configured to convey the blowing agent into the mixing unit;
    an injection unit configured to inject the mixture, wherein the injection unit includes a hollow metering cartridge configured to accommodate the mixture and a discharging member slidably disposed in the hollow metering cartridge, the discharging member is movable in a direction parallel to a longitudinal axis of the hollow metering cartridge and is not axially rotatable relative to the hollow metering cartridge;
    a first flow control element disposed between the melting unit and the mixing unit and configured to control flow of the polymeric material from the melting unit to the mixing unit; and
    a second flow control element disposed between the mixing unit and the injection unit and configured to control flow of the mixture from the mixing unit to the injection unit,
    wherein the pushing member has a first groove annularly arranged over a surface of the pushing member, the first groove is in a first depth, the mixing rotor includes a first groove portion having a second groove and a second groove portion having a third groove, the first groove portion is arranged at one end adjacent to the melting unit, the second groove portion is annularly arranged at the other end adjacent to the injection unit, and a groove depth of the second groove and a groove depth of the third groove are different from the first depth.

6. The extruding system of claim 5, wherein the groove depth of the second groove is different from the groove depth of the third groove.

7. The extruding system of claim 5, further comprising a monitoring module configured to monitor the extruding system in real time, wherein the monitoring module includes a central processor configured to control a pushing force of the discharging member applied to the mixture accumulated in the metering cartridge, and a sensor installed in the injection unit and configured to sense a pressure in the metering cartridge and communicate with the central processor, the central processor adjusts the pushing force in real time according to the pressure of the injection unit sensed by the sensor.

8. The extruding system of claim 5, wherein the groove depth of the second grooved is less than the first depth.

9. The extruding system of claim 5, wherein the blowing agent supply unit is disposed proximal to the first flow control element and distal to the second flow control element.

10. The extruding system of claim 5, wherein the first flow control element is configured to switch between an open configuration and a closed configuration, the open configuration allows the polymeric material to flow from the melting unit into the mixing unit, and the closed configuration prevents the polymeric material from flowing from the mixing unit back to the melting unit.

11. The extruding system of claim 5, wherein the hollow pressing cartridge has a first pressure, the hollow mixing cartridge has a second pressure, and the first pressure is greater than the second pressure.

12. The extruding system of claim 10, wherein the first flow control element is disposed at a first port connecting the melting unit to the mixing unit.

13. The extruding system of claim 5, wherein the second flow control element is configured to switch between an open configuration and a closed configuration, the open configuration allows the mixture to flow from the mixing unit into the injection unit, and the closed configuration prevents the polymeric material from flowing from the injection unit back to the mixing unit.

14. The extruding system of claim 5, wherein the hollow mixing cartridge has a second pressure, the hollow metering cartridge has a third pressure, and the second pressure is greater than the third pressure.

15. The extruding system of claim 13, wherein the second flow control element is disposed at a second port connecting the mixing unit to the injection unit.

16. The extruding system of claim 5, wherein a first angle is between a longitudinal axis of the pushing member and a longitudinal axis of the mixing rotor, a second angle is between the longitudinal axis of the mixing rotor and a longitudinal axis of the discharge member, and each of the first angle and the second angle is greater than 0 degrees and less than 90 degrees.

17. An extruding system, comprising:
a melting unit configured to convey a polymeric material, wherein the melting unit includes a hollow pressing cartridge and a pushing member rotatable within the hollow pressing cartridge;
a mixing unit configured to receive the polymeric material from the melting unit and configured to mix the polymeric material with a blowing agent to form a mixture of the polymeric material and the blowing agent, wherein the mixing unit includes a hollow mixing cartridge and a mixing rotor rotatably disposed in the hollow mixing cartridge, the mixing rotor is immovable in a direction parallel to a longitudinal axis of the mixing cartridge, is axially rotatable relative to the hollow mixing cartridge;
a blowing agent supply unit connected to the mixing unit and configured to convey the blowing agent into the mixing unit;
an injection unit configured to inject the mixture, wherein the injection unit includes a hollow metering cartridge configured to accommodate the mixture and a discharging member slidably disposed in the hollow metering cartridge, the discharging member is movable in a direction parallel to a longitudinal axis of the hollow metering cartridge and is not axially rotatable relative to the hollow metering cartridge; and
a monitoring module configured to monitor the extruding system in real time, wherein the monitoring module includes a sensor disposed in the extruding system,
wherein the pushing member has a first groove annularly arranged over a surface of the pushing member, the first groove is in a first depth, the mixing rotor includes a first groove portion having a second groove and a second groove portion having a third groove, the first groove portion is arranged at one end adjacent to the melting unit, the second groove portion is annularly arranged at the other end adjacent to the injection unit, and a groove depth of the second groove and a groove depth of the third groove are different from the first depth.

18. The extruding system of claim 17, wherein the monitoring module further includes a plurality of sensors disposed throughout the extruding system.

19. The extruding system of claim 17, wherein the monitoring module is configured to automatically monitor and instantly adjust the processing conditions of the extruding system in accordance with the processing conditions sensed by the sensor or determined by an analysis of a central processor.

20. The extruding system of claim 17, further comprising:
a first flow control element disposed between the melting unit and the mixing unit and configured to control flow of the polymeric material from the melting unit to the mixing unit; and
a second flow control element disposed between the mixing unit and the injection unit and configured to control flow of the mixture from the mixing unit to the injection unit.

* * * * *